US012509563B2

(12) United States Patent
Padmanabhan et al.

(10) Patent No.: US 12,509,563 B2
(45) Date of Patent: Dec. 30, 2025

(54) PROCESS FOR PREPARING FIBER REINFORCED POLYVINYL CHLORIDE COMPOSITION AND PRODUCTS

(71) Applicant: Steer Engineering Private Limited, Bangalore (IN)

(72) Inventors: Babu Padmanabhan, Bangalore (IN); P. B. Raman, Bangalore (IN)

(73) Assignee: Steer Engineering Private Limited, Bangalore (IN)

( * ) Notice: Subject to any disclaimer, the term of this patent is extended or adjusted under 35 U.S.C. 154(b) by 796 days.

(21) Appl. No.: 16/769,700

(22) PCT Filed: Dec. 7, 2018

(86) PCT No.: PCT/IB2018/059762
§ 371 (c)(1),
(2) Date: Jun. 4, 2020

(87) PCT Pub. No.: WO2019/111224
PCT Pub. Date: Jun. 13, 2019

(65) Prior Publication Data
US 2020/0369839 A1    Nov. 26, 2020

(30) Foreign Application Priority Data

Dec. 8, 2017  (IN) .............................. 201741044221

(51) Int. Cl.
*C08J 5/04*       (2006.01)

(52) U.S. Cl.
CPC .............. *C08J 5/043* (2013.01); *C08J 5/042* (2013.01); *C08J 5/045* (2013.01); *C08J 5/046* (2013.01); *C08J 2327/06* (2013.01); *C08J 2353/02* (2013.01)

(58) Field of Classification Search
CPC ... C08J 5/043; C08J 5/042; C08J 5/045; C08J 5/046; C08J 2327/06; C08J 2353/02; C08L 27/06; C08L 55/02; C08K 3/40; C08K 7/02; C08K 7/04; C08K 7/14
See application file for complete search history.

(56) References Cited

U.S. PATENT DOCUMENTS

| | | | |
|---|---|---|---|
| 3,304,282 A | 2/1967 | Anton et al. | |
| 3,644,576 A * | 2/1972 | Sehm | C08L 33/08 525/226 |
| 4,957,793 A * | 9/1990 | Guettouche | F16L 9/21 138/155 |
| 5,023,036 A * | 6/1991 | Lee | C08J 3/226 264/331.12 |
| 5,030,676 A * | 7/1991 | Wallen | C08K 5/58 524/436 |
| 5,248,553 A * | 9/1993 | Miyashita | C08K 7/04 252/511 |
| 5,250,616 A * | 10/1993 | Asay | C08L 27/06 525/85 |
| 5,264,261 A | 11/1993 | Bush | |
| 5,275,776 A | 1/1994 | Hara et al. | |
| 5,358,680 A | 10/1994 | Boissonnat et al. | |
| 6,093,359 A | 7/2000 | Gauchel et al. | |
| 6,162,536 A * | 12/2000 | Montsinger | B29C 70/882 264/495 |
| 6,186,769 B1 | 2/2001 | Hawley | |
| 6,428,728 B1 | 8/2002 | Sakai et al. | |
| 6,565,348 B1 | 5/2003 | Snijder et al. | |
| 2006/0103045 A1 | 5/2006 | O'Brien-Bernini et al. | |
| 2007/0007685 A1 | 1/2007 | Gleich et al. | |
| 2008/0251769 A1 * | 10/2008 | Li | C08K 9/02 252/514 |
| 2008/0293861 A1 | 11/2008 | Wang | |
| 2009/0065965 A1 | 3/2009 | Bowen | |
| 2016/0214277 A1 | 7/2016 | Saga et al. | |
| 2016/0279828 A1 * | 9/2016 | Padmanabhan | B29B 7/489 |

FOREIGN PATENT DOCUMENTS

| | | |
|---|---|---|
| CN | 102417689 A | 4/2012 |
| CN | 106832653 A | 6/2017 |

OTHER PUBLICATIONS

International Search Report and Written Opinion dated Mar. 14, 2019 for International Application No. PCT/IB2018/059762, 9 pages.

* cited by examiner

*Primary Examiner* — Jane L Stanley
(74) *Attorney, Agent, or Firm* — Frost Brown Todd LLP

(57) ABSTRACT

A process for preparing a fiber reinforced thermoplastic is disclosed. The process includes melting a first thermoplastic and a second thermoplastic in a melting zone of a twin-screw processor, feeding at least one continuous fiber downstream of the melting zone into a melted mixture of the first thermoplastic and the second thermoplastic, incorporating the at least one continuous fiber into the melted mixture in a mixing zone, the mixing zone including at least one wave element having a continuous outer surface in the form of a helical wave, and obtaining the fiber reinforced thermoplastic from the twin screw processor. Further, a fiber reinforced thermoplastic composition prepared by an extrusion process the composition having a density between 1.3 g/cc to 1.7 g/cc and a flexural modulus of at least 4000 MPa is disclosed.

7 Claims, 3 Drawing Sheets

PROCESS FOR PREPARING FIBER REINFORCED POLYVINYL CHLORIDE COMPOSITION AND PRODUCTS

FIELD OF INVENTION

The present disclosure relates to fiber reinforced thermoplastics and a process for preparing a long fiber reinforced, polyvinyl chloride (PVC) composition. More specifically, the present disclosure relates to a fiber reinforced PVC composition and a process for preparing fiber reinforced PVC composition in a twin-screw processor.

BACKGROUND

Fiber reinforced thermoplastic resin is a composite material made of a polymer matrix impregnated and reinforced with a fiber. In recent years, an application of fiber reinforced thermoplastic resins has greatly expanded, as fiber reinforced thermoplastic resins may be molded into a variety of shapes and components. Some exemplary applications include construction, industrial, agricultural, and household applications like pipes, pipefittings, window frames, and door frames. The use of continuous glass roving (i.e. a bundle of many filaments), to make LFT (long glass filled thermoplastic) has been suggested.

While incorporation of long fibers in thermoplastics is desirable, there remain process challenges in preparing such compositions, especially in an efficient and continuous manner.

U.S. Pat. No. 3,304,282 discloses a thermoplastic in granulate or powder form melted in a twin-screw extruder having degassing means. The volatile constituents of the melt are removed in a manner which is conventional with extruders. Glass fibers are supplied through an inlet provided after the melting zone in the form of endless rovings. The desired glass fiber content in the plastic is set up by correlation of the rate of rotation of the screw shaft and the number and thickness of the rovings. The glass fibers are broken up to the desired size in the presence of the melt by a screw section located beyond the inlet for the glass fibers.

U.S. Pat. No. 6,428,728 discloses a process for production of a fiber reinforced thermoplastic resin structure by melt extrusion by an extruder of a thermoplastic resin and a continuous roving. The process for production of a fiber reinforced thermoplastic resin structure comprises passing a molten thermoplastic resin and reinforcing fibers as a continuous roving through a control mechanism. The control mechanism formed by processing a screw and/or cylinder to give at least part of the screw surface and/or the cylinder inner wall irregular surfaces and thereby controlling the degree of combing and/or fiber length of the reinforcing fibers in the thermoplastic resin matrix of the comb action of the irregular surfaces.

DETAILED DESCRIPTION

Figure 1:
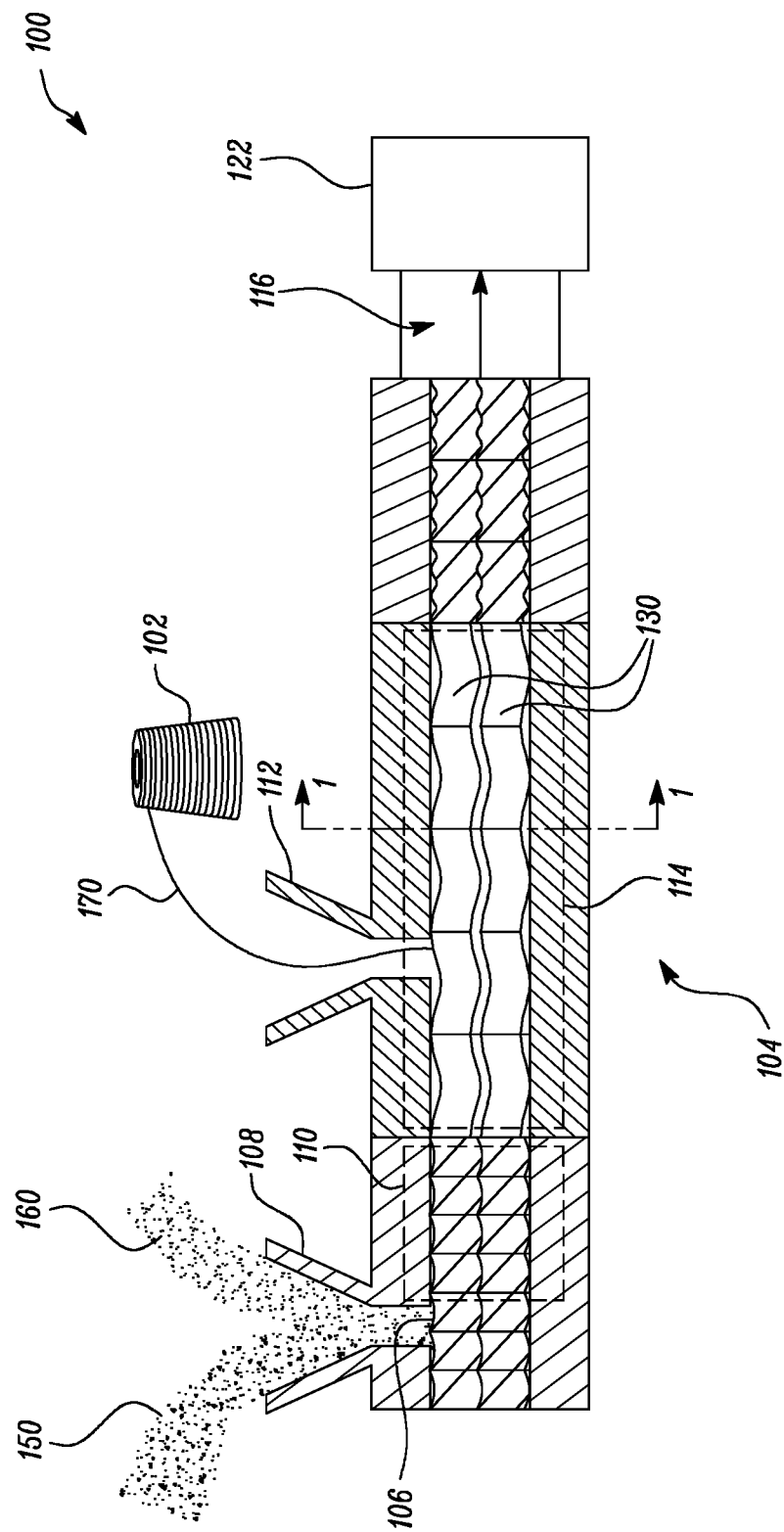
FIG. 1 depicts a twin-screw processor system in accordance with an embodiment of the present disclosure.

Referring to FIG. 1, a twin-screw processor system 100 is disclosed. The twin-screw processor system 100 is applied to reinforce polyvinyl chloride (PVC) composition with continuous fibers and then form articles, such as pipes and profiles from the reinforced PVC composition is disclosed. The twin-screw processor system 100 includes a twin-screw processor 104 having an input barrel 106. In accordance with an embodiment of the present disclosure, the twin-screw processor 104 is a twin-screw extruder. For example, the twin-screw extruder may be a co-rotating twin-screw extruder. In accordance with an embodiment, the twin-screw processor 104 is configured to operate up to a screw speed of 400 rotations per minute (rpm). Although it is possible that the twin-screw processor 104 operates at a screw speed that is higher than 400 rpm, in certain scenarios. In some implementations, a process performed by the twin-screw processor 104 may have the screw speed range between 50 rpm and 1000 rpm.

The twin-screw processor system 100 further includes a feeder 108. The feeder 108 may be frusto-conical portion formed on the twin-screw processor system 100 as shown in FIG. 1. Input materials i.e. one or more materials to be fed into the barrel 106 of the twin-screw processor system 100 are supplied through the feeder 108. While the feeder 108 has been illustrated as a frusto-conical member, it may be contemplated that in various other embodiments, the feeder 108 may have alternative shapes such as a square shape, cylindrical shape, and the like.

In the embodiment illustrated, the barrel 106 is configured to receive a first thermoplastic 150 and a second thermoplastic 160 through the feeder 108. The first thermoplastic 150 may be fed from a resin source (not shown), through the feeder 108, and may be added in the form of a powder into the input barrel 106. For example, the first thermoplastic 150 i.e., in an embodiment, PVC may include resins of un-plasticized PVC that can be repeatedly melted and solidified by heating and cooling. The first thermoplastic 150 may include a homo-polymer or a co-polymer. Examples of the first thermoplastic 150 include, but not limited to, polypropylene, polyethylene, polyamides, polyamines, polycarbonate, and the like. Such thermoplastics may be plasticised or un-plasticised. By way of an example, the first thermoplastic 150 is an un-plasticised polyvinyl chloride (PVC).

The second thermoplastic 160 may also be fed through the feeder 108 and may be added in the form of a powder/granules/other form into the input barrel 106. The second thermoplastic 160 may be a homo-polymer or a co-polymer. Examples of the second thermoplastic 160 include, but not limited to, polystyrene, styrene-acrylonitrile copolymers, acrylonitrile-butandiene-styrene terpolymers, polysulphones, polyesters, polyurethanes, polyphenylene sulfides, polyvinyl chloride, polyphenylene ethers, polystyrene, and the like. By way of an example, the second thermoplastic 160 may be acrylonitrile-butadiene-styrene (ABS).

The input barrel 106 may include short lead kneading elements that increases and/or maintains a residence time (i.e., a time for which the materials/thermoplastics reside in a zone of the twin-screw processor 104) of the first thermoplastic 150 and the second thermoplastic 160 in the input barrel 106. A high residence time, in addition to a relatively higher temperature of the input barrel 106, enables a softening or melting of the first thermoplastic 150 and the second thermoplastic 160 as the first thermoplastic 150 and the second thermoplastic 160 are conveyed and introduced into the input barrel 106 from the feeder 108. In accordance with an embodiment, the temperature in the input barrel 106 is in the range of 25° C. to 30° C. In accordance with an embodiment, the residence time of the first thermoplastic 150 and the second thermoplastic 160 in the input barrel 106 is in the range of 2 to 4 seconds.

A mixture of first thermoplastic 150 and the second thermoplastic 160 may then be received by a melting zone 110 from the input barrel 106 due to the positive displacement action generated by the twin screw extruder 104. Within the melting zone 110, mixing forces generated (in an example may be co-rotating mixing action), and the temperature (generated/maintained) mixes the first thermoplastic 150 with the second thermoplastic 160 to form a molten thermoplastic mixture. In the embodiment illustrated, the molten thermoplastic mixture (i.e. mixture of the first thermoplastic 150 and the second thermoplastic 160) may be a mixture of un-plasticised polyvinyl chloride (PVC) and acrylonitrile-butadiene-styrene (ABS).

The melting zone 110 may include one or more heating elements (not shown) that aid in maintaining a minimum temperature of the melting zone 110, and which may also help melt the first thermoplastic 150 and the second thermoplastic 160 received from the input barrel 106. In one example, a temperature of the melting zone 110 may be maintained between 125° C. and 175° C. to melt the first thermoplastic 150 and the second thermoplastic 160, while a residence time of the mixture in the melting zone 110 may range between 1 to 2 seconds. Such conditions and the mixing forces generated by the twin screw processor 104 uniformly mix the first thermoplastic 150 and the second thermoplastic 160 to generate a molten thermoplastic mixture of un-plasticised PVC and ABS.

To the molten thermoplastic mixture of un-plasticised polyvinyl chloride (PVC) and acrylonitrile-butadiene-styrene (ABS), at least one continuous fiber is introduced via a fiber source 102. The fiber source 102 may include one or more reels of the fiber(s) for continuously supplying the fiber(s) into the molten thermoplastic mixture/composition. In an embodiment, the twin-screw processor system 100 may include a guide tube (not shown) for introducing the continuous fiber in a proper position in the twin screw processor 104.

In an embodiment, at least one continuous fiber 170 is introduced via a fiber feeder 112. In an embodiment, the fiber feeder 112 may be configured to input the at least one continuous fiber 170 in the melting zone 110. In such an embodiment, the at least one continuous fiber is introduced in the melting zone 110 such that a melting of the un-plasticised PVC (i.e., first thermoplastic 150 resin) and of the acrylonitrile-butadiene-styrene ABS (i.e., second thermoplastic 160 resin) is performed at a temperature that may not degrade the at least one continuous fiber 170. For example, in the case of natural fibers the temperature maintained in the melting zone 110 may be less than the temperature at which the natural fiber starts degrading.

In an embodiment as illustrated in FIG. 1, the at least one continuous fiber 170 is introduced via the fiber feeder 112 after the melting zone 110 i.e., in the mixing zone 114. The fiber feeder 112 may be formed in the twin-screw processor on the mixing zone 114 and may be configured to input the continuous fiber(s) 170 in the mixing zone 114. In accordance with another embodiment, there may be an intermediary zone (not shown) located between the melting zone 110 and the mixing zone 114, and the fiber feeder 112 may be located in the intermediary zone.

The continuous fiber(s) 170 may be added to the twin-screw processor 104 in the form of one or more fiber rovings (i.e. from the fiber source 102). The fiber roving(s) may include a long and narrow bundle of one or more strands of fiber with each fiber having a diameter of 10 μm (i.e., 10' metres). The fiber may be a bundle of filaments or a twisted twine of natural fibers. In accordance with an embodiment, the at least one continuous fiber 170 may include a plurality of fiber rovings of same or different types of fiber. Examples of the fiber include, but not limited to, fiber glass, carbon fiber, polyester fiber, natural fiber, such as jute, wool, silk, hemp, cellulose in any form such as viscose, cotton, and the like. In accordance with an embodiment, the fiber may include a plurality of fibers. The plurality of fibers can include same or different types of the fiber. In accordance with an exemplary embodiment illustrated in FIG. 1, the at least one continuous fiber 170 is fed in the form of glass fiber rovings (i.e. glass fiber rovings are continuously introduced into the molten thermoplastic mixture of un-plasticised polyvinyl chloride (PVC) and acrylonitrile-butadiene-styrene (ABS)). In an embodiment an Indian glass fiber roving(s) was used as the at least one continuous fiber 170. In an embodiment, a glass fiber roving procured from Korea was used as the at least one continuous fiber 170. In another embodiment, a German glass fiber was used as the continuous fiber(s) 170. In an embodiment, the fiber is introduced into a proper position (i.e. for proper incorporation into the molten thermoplastic composition) in the twin-screw processor 104 through a guide tube (not shown).

In an embodiment, chopped fiber (i.e. broken pieces of fiber having length in the range of 1-50 mm) may be fed into the twin-screw processor 104 via the fiber feeder 112 or through a separate feeder. In an embodiment, at least one continuous fiber 170 and chopped fiber may be fed into the twin-screw processor 104.

The molten thermoplastic mixture (the first thermoplastic 150 and the second thermoplastic 160) along with the at least one continuous fiber 170 is received by the mixing zone 114. The mixing zone 114 is configured to mix the at least one continuous fiber 170 in the molten thermoplastic mixture such that the at least one continuous fiber 170 is dispersed and incorporated within the matrix of the molten thermoplastic mixture (the first thermoplastic 150 and the second thermoplastic 160).

Such mixing may be attained by producing mixing action (preferably in the form of waves) in the mixture of the at least one continuous fiber 170, the first thermoplastic 150 and second thermoplastic 160. The present disclosure discloses a system and a process that allows incorporation of the fiber in the mixture of un-plasticised PVC and ABS without excessive breakage of the fiber. The mixing zone 114 as disclosed in the present disclosure may minimise attrition of the at least one continuous fiber 170 and may spread the bundle of fibers for proper incorporation (i.e. to infuse and homogenously spread) into molten thermoplastic mixture/composition (un-plasticised PVC+ABS). More particularly, the mixing zone 114 may be configured to maximise dispersion (distribution) of the at least one continuous fiber 170 into the molten thermoplastic mixture (the first thermoplastic 150 and the second thermoplastic 160). Thus, the mixing zone 114 reduces the breaking down of the fiber(s) 170 into sizes that are generally achieved using current technology. Additionally, the mixing zone 114 allows incorporation (infusion and homogenous mixing) of the fiber(s) 170 into the un-plasticised PVC composition (i.e., un-plasticized PVC+ABS). The mixing zone 114 includes one or more elements that allow incorporation of the fiber in the un-plasticised PVC composition (i.e., un-plasticized PVC+ABS) in the said manner by producing gentle waves in the mixture of the fiber and un-plasticized PVC+ABS. The waves reduce the breakage of the fiber(s)

170, thereby facilitating long strands of fiber(s) 170 to be incorporated within the un-plasticised PVC composition.

The twin screw processor 104 may further include a wetting system that allows the fiber to be wetted before mixing. Thereby, enabling the fiber to be homogeneously distributed within the molten thermoplastic mixture/composition. The fiber introduced may be configured to interact with the liquid(s)/additives present in the wetting system such that the liquid(s) accumulates over the fiber and in some cases encapsulates the fiber. Wetting of fiber(s) results in homogenous mixing of fiber with the molten thermoplastic mixture (the first thermoplastic 150 and the second thermoplastic 160) and prevents the presence of loose fiber (s) sticking to the molten thermoplastic mixture.

Figure 2:
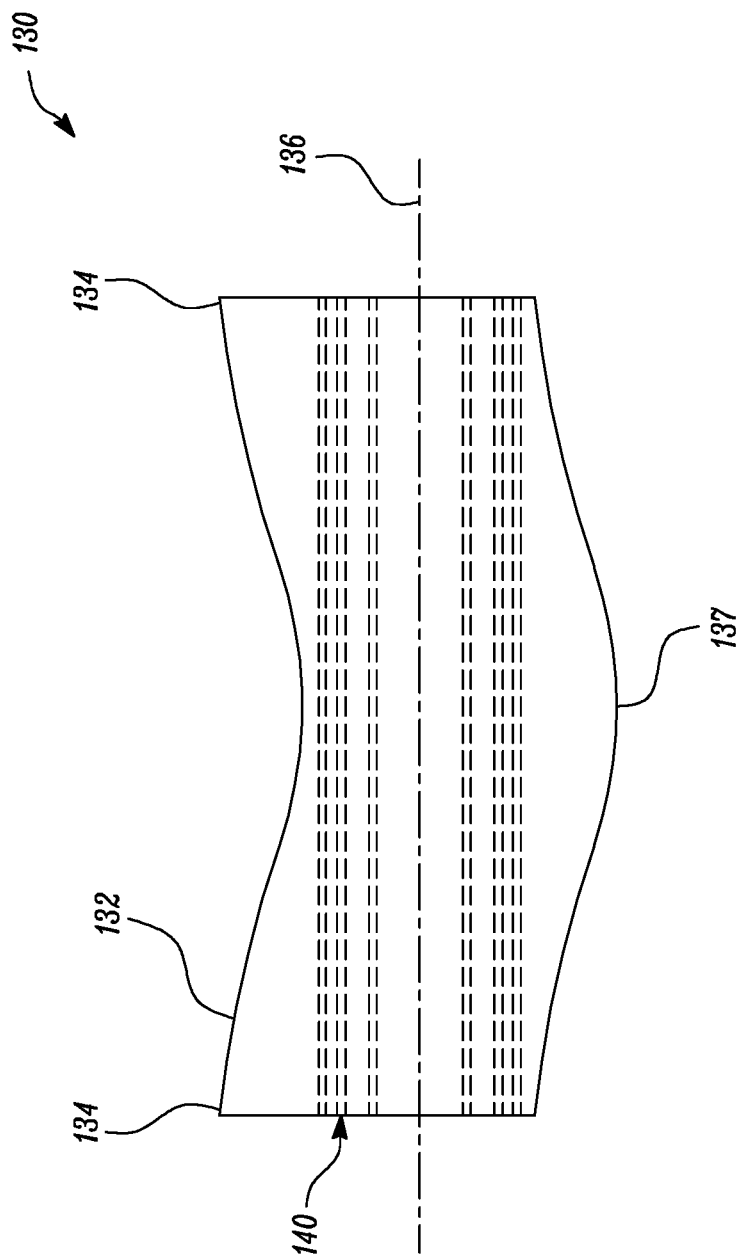
FIG. 2 depicts a wave element that is used in a mixing zone of the twin-screw processor system in accordance with an embodiment of the present disclosure.
Figure 3:
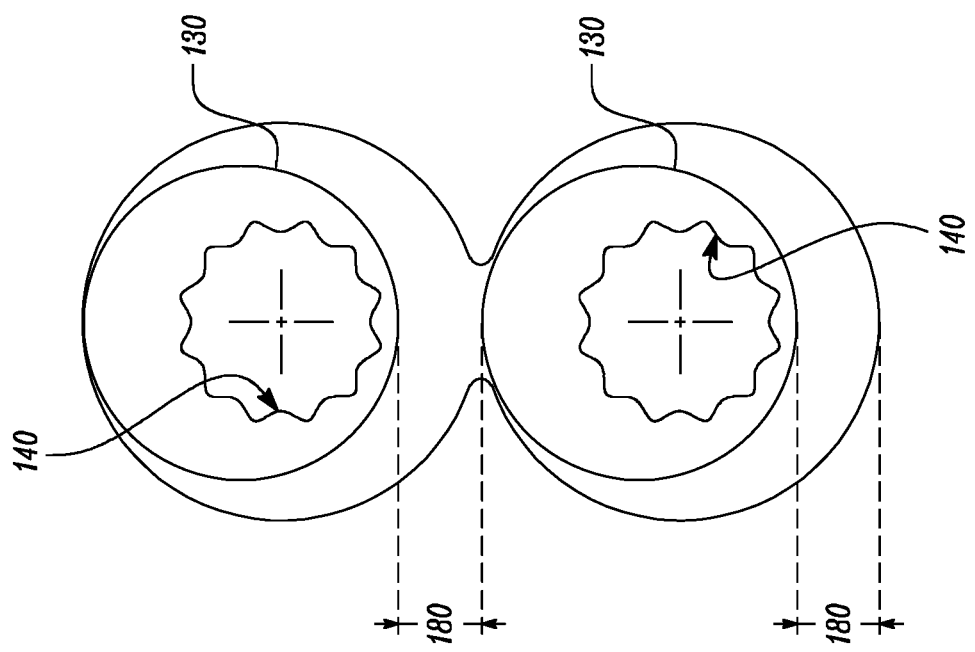
FIG. 3 illustrates a cross sectional view of the twin-screw processor system along line 1-1', in accordance with an embodiment of the present disclosure.

In accordance with an embodiment, the mixing zone 114 (as illustrated in FIG. 1) may utilize one or more wave elements 130 (as illustrated in FIG. 2) where each element has a continuous outer surface 132 in the form of a helical wave. More specifically, each wave element 130 includes an axial bore 140 configured for engaging with one drive shaft of the twin-screw extruder (also shown in FIG. 4). Each element 130 further includes the continuous outer surface 132 forming at least one crest 134 and at least one trough 137 in a direction parallel and perpendicular to an element axis 136 to form a helical wave. Additionally, the element 130 is shaped such that when placed on the drive shaft a distance/clearance as marked by reference numeral 180 is obtained between the element 130 and bore at certain locations where the element 130 is placed, as shown in FIG. 4.

Such an element, having the design parameters as discussed above, allows incorporation of the at least one continuous fiber 170 in the mixture of unplasticised PVC and ABS (second thermoplastic 160) without excessive breakage of the at least one continuous fiber 170 (i.e., minimum attrition of the at least one continuous fiber 170) and may spread the at least one continuous fiber 170 for proper incorporation into molten thermoplastic mixture (unplasticised PVC+ABS) to maximise dispersion of the fiber into the molten thermoplastic matrix of un-plasticised PVC and ABS. In an embodiment, the mixing zone 114 has only wave elements 130. For example, the twin-screw extruder may include 'n' wave elements (where 'n' is an integer greater than 0) disposed on each of the two drive shafts in the mixing zone 114.

The twin-screw processor system 100 may further include a discharge zone 116 configured to facilitate as an outlet for an extrudate i.e., fiber reinforced thermoplastic composition (the at least one continuous fiber 170 dispersed within the matrix of first thermoplastic 150 and second thermoplastic 160) from the mixing zone 114. The discharge zone 116 includes a metering section that is configured to transfer, without interruption, a constant volume of the mixture into a die 122. In the embodiment, the metering section is provided before the die 122.

In an embodiment, the twin screw processor system 100 may further includes a sizing system and a washing system. The washing system may be a system of the twin screw processor 104 and may be configured to wash the extrudate via chemical solvents. Such washing may remove the glass fibers that do not disperse in the extrudate—matrix of molten thermoplastic composition (i.e., unplasticised PVC+ ABS) and cling on to the outer surface of the extrudate. Subsequent to the washing system, the extrudate may pass through the sizing system to stabilise and refine a shape of the extrudate i.e. the extrudate is finally formed into an article such as a pipe or a profile by the die 122.

The disclosure as presented above discloses a twin-screw processor system 100. However, the present disclosure also relates to a method and/or a process for preparing long fiber reinforced unplasticised polyvinyl chloride (PVC) compositions. Out of such compositions, articles such as PVC pipes and profiles are made. The disclosed process allows an incorporation of long and continuous fibers in the composition comprising unplasticised PVC and ABS matrix.

The process includes feeding the first thermoplastic 150 and the second thermoplastic 160 into the input barrel 106 of the twin-screw processor 104. The first and second thermoplastics 150, 160 may be fed through the feeder 108. Thereafter, the first thermoplastic and the second thermoplastic 150, 160 are conveyed to the melting zone 110 where the first thermoplastic 150 and the second thermoplastic 160 melt to form a molten mixture of thermoplastic materials. The fiber feeder 112 introduces one or more continuous fibers 170 to the molten thermoplastic mixture. Next, the molten thermoplastic mixture and the fiber(s) are conveyed to the mixing zone 114. In the mixing zone 114, the elements of the mixing zone mix/disperse the fiber(s) within the molten thermoplastic mixture. In an embodiment, the mixing zone 114 utilizes one or more wave elements 130 where each element has the continuous outer surface 132 in the form of a helical wave. As discussed, this element 130 allows incorporation of the at least one continuous fiber 170 in the mixture of unplasticised PVC and ABS (second thermoplastic 160) without excessive breakage of the fiber (i.e., minimum attrition of the fiber).

The method further includes conveying the mixture of the thermoplastic composition with the at least one continuous fiber 170 towards the discharge zone 116 of the twin screw processor 104. The metering section of the discharge zone 116 transfers, without interruption, a constant volume of the fiber reinforced thermoplastic composition into the die 122 so that an extrudate, exiting the discharge zone 116, is uniform. The extrudate is shaped using the die 122 into articles, such as a pipe or a profile. Subsequently, the method includes passing the extrudate through a sizer (vacuum or pressure) that helps refine a shape of the extrudate, before the extrudate is cooled.

The fiber reinforced thermoplastic composition extruded from the die 122 can be of any shape. By way of an example, the fiber reinforced thermoplastic composition is extruded as a pipe having a circular cross section. The pipe may be of any length depending on the dimensions of the die 122. The pipe having the composition as disclosed above (i.e., unplasticised PVC mixed with ABS where long glass fibers are incorporated within the matrix of ABS and un-plasticised PVC) may have 0.5-50 percent (by volume) of ABS. Further, the rubber content in ABS may vary in the range of 10 to 80 percent (by volume). Further, the pipe may have strains of glass fiber having length in the range of 1-20 mm.

In some embodiments, the fiber runs continuously along the entire (or nearly the entire) length of the reinforced pipe or profile. In accordance with an embodiment, the plurality of fibers is arranged unidirectionally in the reinforced pipe or profile. In an embodiment, the volume percent of the glass fiber to the total volume percent of unplasticised PVC is 10% to 40%.

In some embodiments, the process to manufacture the articles like pipes as disclosed above may include chopped glass fibers being fed into the twin screw processor 104 in conjunction with the continuous glass fiber rovings. In an embodiment, prior to the formation of the extrudate/final product i.e. pipe, the thermoplastic mixture (i.e. mixture of un-plasticized PVC and ABS) may be stabilized with additives, so as to obtain an optimized formulation. For example, an optimized formulation of the molten thermoplastic resin, added with stabilizers, internal and external lubricants, and other polymer resins to impart special properties, may be envisioned to control a fusion of the fiber into the molten thermoplastic mixture. Such additives and/or additional polymers may be added through the feeders 108, 112 to the input barrel 106 and the melting zone 110, respectively, of the twin screw processor 104. Such additional polymers may include one or more of the thermoplastic resins described hereinabove, or optionally, the additional polymer may also be different from the thermoplastic resins discussed above. Further, examples of additives include, but not limited to, fillers, thermal stabilisers, ultra violet (UV) light stabilisers, coupling agents, colorants, antioxidants, antistats, mold release, clarifiers, nucleating agents, and flame retardants. Examples of fillers include, but not limited to, other than the reinforcing fiber component, such as, but not limited to talc, clay, wollastonite, mica, calcium carbonate or a combination thereof.

The pipe formed from the mixture of PVC and ABS reinforced with glass fibers exhibits properties and strengths greater than those of normal PVC and chlorinated PVC. For instance, the pipe manufactured in one example from the composition as disclosed above has the following strength and performance parameters in comparison to normal PVC and chlorinated PVC:

COMPARISON OF PVC PIPE TEST RESULTS

| | | Test Parameters | | |
|---|---|---|---|---|
| | Units | C-PVC Pipe | Normal PVC Pipe | Current Disclosure Pipe |
| Tensile Strength at yield | MPa*10 | 5.2 | 4.7 | 5.9 |
| Flexural Strength | MPa*10 | 6.8 | 6 | 15.845 |
| Flexural Modulus | MPa*1000 | 2.472 | 1.735 | 8.488 |
| Density | g/cc | 1.56 | 1.4 | 1.46 |

*'MPa'—Mega Pascal = $10^6$ Pascal and 'g/cc'—grams per centimeter$^3$

In another aspect of the present disclosure, a thermoplastic composition is disclosed. The present application discloses a PVC composition prepared by an extrusion process (as disclosed above). The PVC composition is a mixture of PVC and ABS having long glass fibers incorporated in the mixture. The PVC composition exhibits a density between 1.3 g/cc to 1.7 g/cc. In an embodiment, the density of said PVC composition is not more than 1.6 g/cc. In another embodiment, the density of said PVC composition is not more than 1.5 g/cc.

The PVC composition additionally, has a flexural strength of at least 100 MPa. In the example presented, the PVC composition has a flexural strength of 158.45 MPa. The PVC composition also has a tensile strength greater than 50 MPa. In the example presented above the tensile strength of the PVC composition is 59 MPa. The disclosed PVC composition also has a flexural modulus of over 4000 MPa. In the example presented above the flexural modulus of the PVC composition is 8488 MPa.

In another example, the process was utilized to produce a fiber reinforced PVC composition and a pipe was formed using the said fiber reinforced PVC composition. In the example, the PVC composition was formed by using PVC resins from Owens Corning Korea (K67 resin), ABS and continuous fibers. The formed pipe had the following properties, strength parameters and dimensions:

| | Outer Diameter (mm) | Wall Thickness (mm) | Wt. of pipe per meter (gms) | Deflection with 18.5 Kg load (mm) | PSDC TS/FS/FM (MPa) |
|---|---|---|---|---|---|
| Plain PVC | 32 | 2.0 | 253 | 60 (3.2 Kg load) | 47/60/1588 |
| C-PVC | 28.6 | 2.8 | 336 | 75 | 47/63/2422 |
| Current Disclosure | 25 | 2.8 | 303 | 45 | 42/76/4141 |

'TS'—Tensile Strength, 'FS'—Flexural Strength, 'FM'—Flexural Modulus, 'OD'—Outer Diameter, 'mm'—millimeter, 'MPa'—Mega Pascal The pipe formed using the process and composition (fiber reinforced PVC composition) discussed above has an outer diameter of 25 mm. The pipe has a wall thickness of 2.8 mm. When a deflection test was conducted on the pipe with 18.5 Kg load, a deflection of 45 mm was detected. Additionally, the pipe exhibited a tensile strength of 42 MPa, a flexural strength of 76 MPa and a flexural modulus of 4141 MPa.

INDUSTRIAL APPLICABILITY

A performance of fiber reinforced thermoplastics generally depends on the type of resin, mechanical and physical properties of the fiber, and the length of the fiber in the final product. Such performance may also depend on a mass of the fiber, replacing the resin and the fiber's orientation. In one example, the strength of the fiber reinforced thermoplastic resin is influenced by mechanical properties of the fiber and thermoplastic resin used. Further, it also depends on a volume of the thermoplastic resin and the fiber relative to one another, length of the fiber, and an orientation of fiber within the thermoplastic resin.

The disclosed process enables preparation of continuous fiber reinforced unplasticised PVC, such as PVC pipes and profiles in a simple, efficient, and cost-effective manner. The process disclosed allows the processing of highly sensitive and degradable thermoplastic resins such as un-plasticised polyvinyl chloride that cannot be easily compounded with any material. In particular, the disclosed process provides for increasing and in some instances doubling the tensile property of the PVC product. Such a process enables significant reduction in the attrition of the fiber and proper incorporation of the fiber into the un-plasticised PVC matrix. The presence of the one or more wave elements in the mixing zone allows incorporation of the fiber in the mixture of unplasticised PVC and ABS (second thermoplastic) without excessive breakage of the fiber (i.e., minimum attrition of the fiber). Further, such elements spread the bundle of fibers for proper incorporation into molten thermoplastic mixture (PVC+ABS) and maximise dispersion and orientation of the fiber into the molten thermoplastic matrix of PVC and ABS. Moreover, the process results in substantial increase in tensile strength of the pipe/profile so far unrealized in any process or system of reinforced PVC.

Moreover, the first thermoplastic and the second thermoplastic i.e. (unplasticised PVC+ABS) when mixed together in the said manner as disclosed above, produce an extrudate which can be continuously fed to the die to produce articles such as pipes of long dimensions such as pipes having a length of 1 kilometer. Accordingly, such a method and composition as disclosed herein allows for production of articles of length so far unrealized in any process or system of reinforced unplasticised PVC.

Additionally, the current disclosure discloses a PVC composition having plethora of advantages over chlorinated PVC and normal PVC. As an example, without significant increase in weight and density of the pipes formed by the PVC composition (as disclosed in the present application) as compared to pipes of PVC or CPVC, a significant improvement in properties such as tensile strength, flexural strength, flexural modulus and density are observed.

Particularly, by maintaining the same density as in conventional PVC or chlorinated PVC, the present PVC composition more than doubles one or more of tensile strength, flexural strength, flexural modulus and density.

We claim:

1. A process for preparing a fiber reinforced thermoplastic, the process comprising:

melting a first thermoplastic and a second thermoplastic in a melting zone of a twin-screw processor, wherein the first thermoplastic is un-plasticised polyvinyl chloride (u-PVC) and the second thermoplastic is acrylonitrile-butadiene-styrene (ABS);

feeding at least one continuous fiber downstream of the melting zone into a melted mixture of the un-plasticised polyvinyl chloride (u-PVC) and the acrylonitrile-butadiene-styrene (ABS);

incorporating the at least one continuous fiber into the melted mixture in a mixing zone, the mixing zone including at least one wave element having a continuous outer surface in the form of a helical wave, wherein the continuous outer surface of the wave element is formed by at least one crest and at least one trough in a direction parallel and perpendicular to an element axis to form the helical wave; and obtaining the fiber reinforced thermoplastic from the twin screw processor.

2. The process as claimed in claim 1, wherein the at least one continuous fiber includes one or more fiber rovings and each fiber roving includes at least one strand of fiber having a diameter of 10 μm.

3. The process as claimed in claim 1, wherein a rubber content in the acrylonitrile-butadiene-styrene (ABS) is in a range of 10 to 80 percent by volume.

4. The process as claimed in claim 3, further comprising feeding chopped fiber downstream of the melting zone into the melted mixture of the first thermoplastic and the second thermoplastic.

5. The process as claimed in claim 4, wherein a volume percent of the continuous and chopped fiber to a total volume of un-plasticised PVC is 10% to 40%.

6. The process as claimed in claim 1, wherein no kneading blocks and elements are present in the mixing zone.

7. The process as claimed in claim 1, wherein the fiber reinforced thermoplastic has at least 50% of the fibers greater than 5 mm in length respectively.

* * * * *